US009208479B2

(12) United States Patent
Fuentes et al.

(10) Patent No.: US 9,208,479 B2
(45) Date of Patent: Dec. 8, 2015

(54) INCIDENT MANAGEMENT FOR AUTOMATED TELLER MACHINES

(71) Applicant: Bank of America Corporation, Charlotte, NC (US)

(72) Inventors: Harry Alexander Fuentes, Fairview Heights, IL (US); Dion L. Bellamy, Valley Park, MO (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/644,917

(22) Filed: Mar. 11, 2015

(65) Prior Publication Data

US 2015/0186852 A1 Jul. 2, 2015

Related U.S. Application Data

(63) Continuation of application No. 13/540,691, filed on Jul. 3, 2012.

(51) Int. Cl.

| G06Q 40/00 | (2012.01) |
|---|---|
| G06Q 10/00 | (2012.01) |
| G06Q 40/02 | (2012.01) |
| G06Q 20/38 | (2012.01) |
| G06Q 20/40 | (2012.01) |
| G06Q 20/10 | (2012.01) |
| G07F 19/00 | (2006.01) |

(52) U.S. Cl.
CPC ............ *G06Q 10/20* (2013.01); *G06Q 20/1085* (2013.01); *G06Q 20/38* (2013.01); *G06Q 20/40* (2013.01); *G06Q 40/02* (2013.01); *G07F 19/20* (2013.01)

(58) Field of Classification Search
USPC ......................................... 705/35, 43, 40, 44
See application file for complete search history.

(56) References Cited

U.S. PATENT DOCUMENTS

| 4,621,236 A | 11/1986 | Halbach |
|---|---|---|
| 4,636,947 A | 1/1987 | Ward |
| 4,660,168 A | 4/1987 | Grant et al. |
| 5,666,481 A | 9/1997 | Lewis |

(Continued)

FOREIGN PATENT DOCUMENTS

| EP | 1202197 A1 | 5/2002 |
|---|---|---|
| WO | 03093931 A2 | 11/2003 |

(Continued)

*Primary Examiner* — Lalita M Hamilton
(74) *Attorney, Agent, or Firm* — Banner & Witcoff, Ltd.; Michael A. Springs

(57) ABSTRACT

A computer system monitors a financial transaction system that contains a plurality of remote transaction machines, e.g., automated teller machines (ATMs). The computer system detects and analyzes whether any of the automated teller machines has an outage, whereby customers may be experiencing failed financial transactions. When an outage occurs, a severity level is selected by processing outage data. For example, the computer system determines a measure of the number of failed transactions and then selects a severity level of the outage from which the appropriate recovery procedure can then be initiated. When the transaction system comprises a plurality of networks, the severity level of an outage may be determined by aggregating or separately processing outage data for the networks. Outage ATMs may be prioritized from the number of corresponding failed transactions, so that the prioritization can be included in an indicator that initiates resolution of the outage.

21 Claims, 8 Drawing Sheets

(56) References Cited

U.S. PATENT DOCUMENTS

| | | | |
|---|---|---|---|
| 5,691,525 A | 11/1997 | Aoki et al. | |
| 5,751,841 A | 5/1998 | Leong et al. | |
| 6,032,184 A | 2/2000 | Cogger et al. | |
| 6,057,646 A | 5/2000 | Pieroth et al. | |
| 6,073,837 A | 6/2000 | Milne | |
| 6,196,457 B1 | 3/2001 | Patterson | |
| 6,241,150 B1 | 6/2001 | Patterson | |
| 6,276,603 B1 | 8/2001 | Patterson | |
| 6,402,024 B1 | 6/2002 | Carnegie et al. | |
| 7,069,184 B1 | 6/2006 | Barger et al. | |
| 7,225,139 B1 | 5/2007 | Tidwell et al. | |
| 7,357,301 B1 | 4/2008 | Bajpay et al. | |
| 7,545,816 B1* | 6/2009 | Coutts | G06Q 20/1085 235/375 |
| 7,636,424 B1 | 12/2009 | Halikhedkar et al. | |
| 7,925,527 B1 | 4/2011 | Flam | |
| 8,083,141 B1 | 12/2011 | Courtright | |
| 2002/0038232 A1 | 3/2002 | Nihira | |
| 2002/0082994 A1 | 6/2002 | Herziger | |
| 2002/0091972 A1 | 7/2002 | Harris et al. | |
| 2003/0217005 A1* | 11/2003 | Drummond | G06F 3/023 705/43 |
| 2004/0153409 A1* | 8/2004 | Shepley | G06Q 20/1085 705/43 |
| 2004/0153437 A1 | 8/2004 | Buchan | |
| 2004/0217162 A1 | 11/2004 | Chigira et al. | |
| 2004/0260723 A1 | 12/2004 | Brooks et al. | |
| 2005/0033668 A1 | 2/2005 | Garcia et al. | |
| 2005/0221267 A1 | 10/2005 | Berman | |
| 2005/0246184 A1 | 11/2005 | Abbadessa et al. | |
| 2006/0134593 A1 | 6/2006 | Kalous et al. | |
| 2006/0173762 A1 | 8/2006 | Clater | |
| 2006/0204943 A1 | 9/2006 | Kimball | |
| 2007/0050239 A1 | 3/2007 | Caneva | |
| 2007/0061460 A1 | 3/2007 | Khan et al. | |
| 2007/0094281 A1 | 4/2007 | Malloy et al. | |
| 2007/0147612 A1 | 6/2007 | Forrest et al. | |
| 2007/0168874 A1 | 7/2007 | Kloeffer et al. | |
| 2007/0250360 A1 | 10/2007 | Goddard et al. | |
| 2007/0260735 A1 | 11/2007 | Olsson et al. | |
| 2007/0294258 A1 | 12/2007 | Caldwell et al. | |
| 2008/0016569 A1 | 1/2008 | Hammer et al. | |
| 2008/0062885 A1 | 3/2008 | Moon et al. | |
| 2008/0086359 A1 | 4/2008 | Holton et al. | |
| 2008/0136657 A1 | 6/2008 | Clark et al. | |
| 2008/0168453 A1 | 7/2008 | Hutson et al. | |
| 2008/0228504 A1 | 9/2008 | Nguyen et al. | |
| 2008/0262904 A1 | 10/2008 | Conway et al. | |
| 2008/0301049 A1 | 12/2008 | Dyson | |
| 2009/0055720 A1 | 2/2009 | Ngo et al. | |
| 2009/0201372 A1 | 8/2009 | O'Doherty et al. | |
| 2010/0127069 A1 | 5/2010 | Henton, Sr. | |
| 2010/0274596 A1 | 10/2010 | Grace et al. | |
| 2011/0191243 A1* | 8/2011 | Allen | G06Q 10/06315 705/43 |
| 2011/0238510 A1 | 9/2011 | Rowen et al. | |
| 2011/0258090 A1 | 10/2011 | Bosch et al. | |
| 2014/0012753 A1* | 1/2014 | Fuentes | G06Q 40/02 705/43 |

FOREIGN PATENT DOCUMENTS

| | | |
|---|---|---|
| WO | 2007149924 A2 | 12/2007 |
| WO | 2008060427 A2 | 5/2008 |
| WO | 2008083345 A2 | 7/2008 |

\* cited by examiner

| FCIs | Severity 3<br>Under 10K FCIs | Severity 2<br>10K up to 25K FCIs | Severity 1<br>Over 25K FCIs |
|---|---|---|---|
| Estimated and/or Calculated FCIs | | | |
| ATMs Down | Severity 3 | Severity 2 | Severity 1 |
| ATMs down due to communication outage / Unplanned changes | 25 - 99 ATMs impacted/hard down from a single outage | 100 to 500 ATMs impacted/hard down from a single outage. Factoring in concentrated regional impact. Also factoring in cumulative impact of greater than 15 minutes (continuous vs intermittent downtime). | |
| | | 500 to 999 ATMs impacted/hard down from a single outage. Factoring in concentrated regional impact. Also factoring in cumulative impact of greater than 15 minutes and up to 2 hours (continuous vs intermittent downtime). | 500 to 999 ATMs impacted/hard down from a single outage. Factoring in concentrated regional impact. Also factoring in cumulative impact of greater than 2 hours (continuous vs. intermittent downtime). |
| | | | 1000 ATMs hard down greater than 15 minutes, from a single outage. |
| Planned Maintenance and/or Change | 25 - 99 ATMs impacted/hard down from a single outage | 100 to 500 ATMs impacted/hard down from a single outage. Factoring in concentrated regional impact. Also factoring in cumulative impact greater than 15 minutes (continuous vs. intermittent downtime). | |
| | | 500 to 999 ATMs impacted/hard down from a single outage. Factoring in concentrated regional impact. Also factoring in cumulative impact greater than 15 minutes and up to 1 hour (continuous vs. intermittent downtime). | 500 to 999 ATMs impacted/hard down from a single outage. Factoring in concentrated regional impact. Also factoring in cumulative impact of greater than 1 hour (continuous vs. intermittent downtime). |
| | | | 1000 ATMs hard down greater than 15 minutes from a single outage. |

FIG. 4

INCIDENT MANAGEMENT FOR AUTOMATED TELLER MACHINES

CROSS-REFERENCE TO RELATED APPLICATION

This application is a continuation of U.S. application Ser. No. 13/540,691 filed on Jul. 3, 2012, entitled "Incident Management for Automated Teller Machines," which is incorporated herein by reference in its entirety.

FIELD

Aspects described herein relate to a computer system that processes information about an outage of a financial transaction system.

BACKGROUND

Customers of financial institutions are becoming more dependent on automated systems for obtaining cash, depositing/withdrawing money to/from accounts, and paying bills. For example, automated teller machines (ATMs) are almost ubiquitous to provide financial transactions for customers. An ATM may enable customers to withdraw cash from one's account, make balance inquiries, and transfer money from one account to another using a plastic, magnetic-strip card with a personal identification number issued by the financial institution.

While automated systems may be more convenient than traditionally staffed locations, automated systems can experience operational problems (often referred as outages) that can disrupt service to customers. Because customers do not have direct contact with a person, automated system outages should be identified and corrected in an expeditious manner to reduce an adverse impact on customers.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

According to traditional systems, the severity of an outage of an automated transaction system may be determined from the number of automated teller machines (ATMs) that are experiencing the outage. However, the number of failed transactions may be dependent on other factors such as the time of day that the outage occurs. For example, transaction activity is typically less at midnight than at noon.

Aspects of the disclosure relate to methods, computer-readable media, and apparatuses for monitoring a financial transaction system that contains a plurality of remote transaction machines, e.g., automated teller machines or cash handling machines. The computer system detects and analyzes whether any of the automated teller machines has an outage, whereby customers may be experiencing failed financial transactions. An outage may be caused for different reasons, both unplanned and planned. An unplanned occurrence may result from a weather-related event that disrupts electrical power to a portion of a transaction system, and consequently some or all or the automated teller machine may not properly support financial transactions for customers. Also, communications through a network with some or all of the automated teller machines may be disrupted, causing an outage between the automated teller machines and a central monitoring and/or control computer. In addition, an outage may occur for planned reasons, e.g., when performing maintenance on the ATMs or communication network. When an outage occurs, the financial provider typically desires to correct the outage as soon as possible to reduce the effect on customers.

According to one or more aspects, a monitoring computer obtains outage status of each ATM of a transaction system. The monitoring computer determines a measure of the number of failed transactions and then selects a severity level of the outage. The appropriate recovery procedure may then be initiated according to the selected severity level.

According to one or more additional aspects, criteria for determining the severity of an outage may be different for planned operations, e.g., scheduled maintenance, versus unplanned events, e.g., network outage.

According to one or more aspects, a transaction system may span a plurality of networks, where each network is supported by a different vendor. The severity level of an outage may be determined by aggregating or separately processing outage data for the networks.

According to one or more aspects, outage ATMs may be prioritized during an outage. The prioritization may be determined from the number of corresponding failed transactions, so that the prioritization can be included in an indicator that initiates resolution of the outage.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be implemented as computer-readable instructions stored on a computer-readable medium, such as a non-transitory computer-readable medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the disclosure will occur to persons of ordinary skill in the art from a review of this disclosure. For example, one of ordinary skill in the art will appreciate that the steps illustrated herein may be performed in other than the recited order, and that one or more steps illustrated may be optional in accordance with aspects of the disclosure.

BRIEF DESCRIPTION OF THE DRAWINGS

The present disclosure is illustrated by way of example and not limited in the accompanying figures in which like reference numerals indicate similar elements and in which:

FIG. 4 illustrates assessing a severity level of a transaction system that is experiencing an outage according to one or more aspects of the present disclosure.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

In accordance with various aspects of the embodiments, a computer system monitors a financial transaction system that contains a plurality of remote transaction machines, e.g., automated teller machines (ATMs) or cash handling machines. The computer system detects and analyzes whether any of the automated teller machines has an outage, whereby customers may be experiencing failed financial transactions. An outage may be caused for different reasons, both unplanned and planned. An unplanned occurrence may result from a weather-related event that disrupts electrical power to a portion of a transaction system, and consequently some or all or the automated teller machine may not properly support financial transactions for customers. Also, communications through a network with some or all of the automated teller machines may be disrupted, causing an outage between the automated teller machines and a central monitoring and/or control computer. Consequently, customers may not be able to complete transactions at an ATM until the outage has been resolved. Planned changes in the surrounding infrastructure that supports the telecommunication equipment/network may also cause a disruption. In addition, an outage may occurred for planned reasons, e.g., when performing maintenance on the ATMs, the telecommunication network/equipment, or the infrastructure that supports the telecommunication network/equipment. When an outage occurs, the financial provider typically desires to correct the outage to reduce the effect on the customers.

Figure 1:
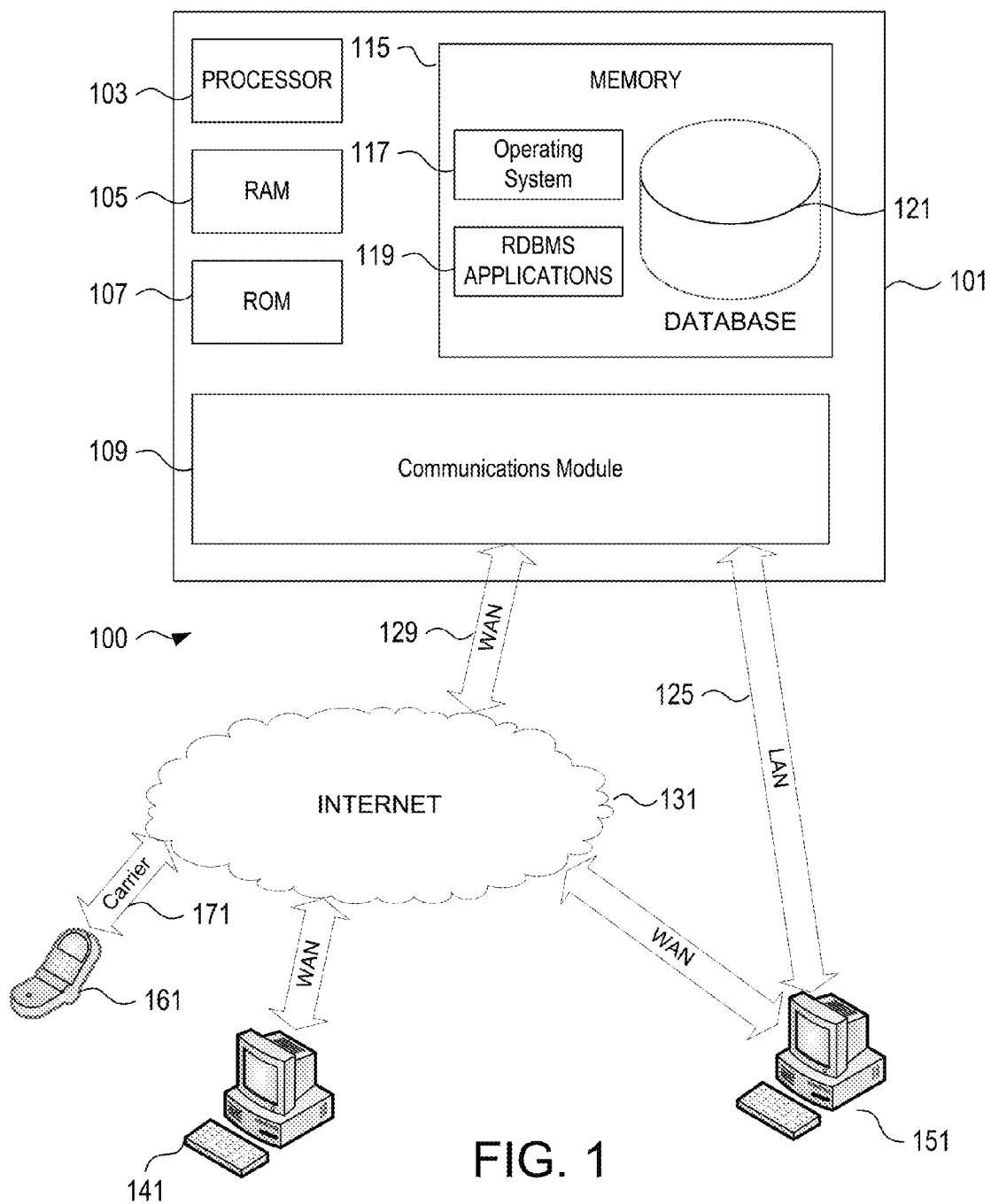
FIG. 1 illustrates an example of a suitable computing system environment that may be used according to one or more illustrative embodiments.

FIG. 1 illustrates an example of a suitable computing system environment 100 that may be used according to one or more illustrative embodiments. For example, as will be further discussed, computing system environment 100 may support processes 500-800 as shown in FIGS. 5-8, respectively, to support a financial transaction system. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including random-access memory (RAM) 105, read-only memory (ROM) 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 100 may also include optical scanners (not shown). Exemplary usages include scanning and converting paper documents, e.g., correspondence and receipts to digital files.

Although not shown, RAM 105 may include one or more are applications representing the application data stored in RAM 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Also, some or all of the computer executable instructions for computing device 101 may be embodied in hardware or firmware.

Computing device 101 may operate in a networked environment supporting connections to one or more remote computing devices, such as computing devices 141, 151, and 161. The computing devices 141, 151, and 161 may be personal computing devices or servers that include many or all of the elements described above relative to the computing device 101. Computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, computing device 101 may be connected to the LAN 125 through a network interface or adapter in the communications module 109. When used in a WAN networking environment, the computing device 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server or in Distributed Computing configuration to permit a user to retrieve web pages from a web-based server. Any of various conventional web browsers can be used to display and manipulate data on web pages.

Additionally, one or more application programs 119 used by the computing device 101, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 101. Such a processor may execute computer-executable instructions stored on a computer-readable medium.

Figure 2:
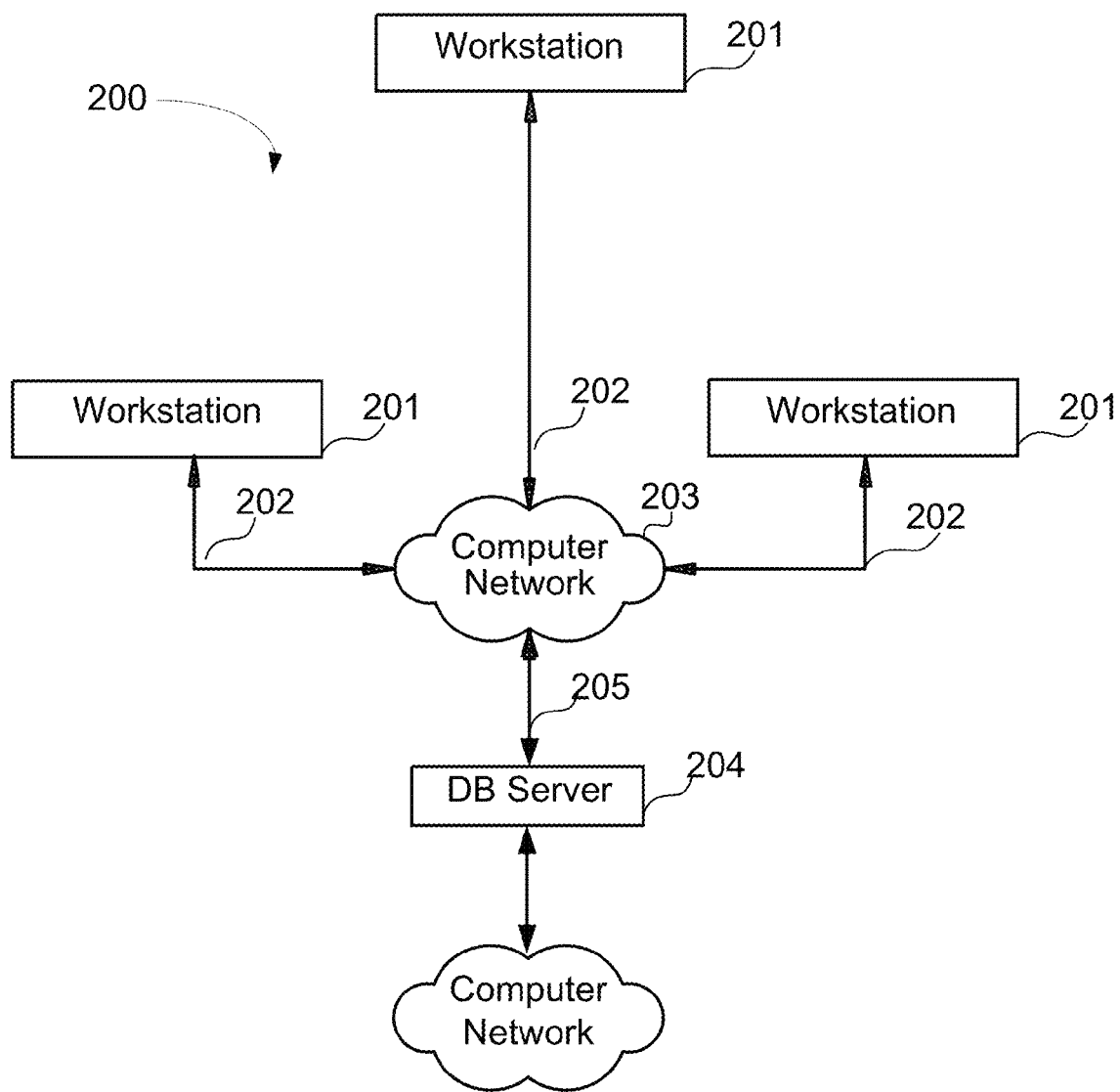
FIG. 2 shows an illustrative system for implementing example embodiments according to one or more aspects of the present disclosure.

Referring to FIG. 2, an illustrative system 200 for implementing example embodiments according to the present disclosure is shown. As illustrated, system 200 may include one or more workstation computers 201. Workstations 201 may be local or remote, and may be connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, and hard-wired links.

The steps that follow in the Figures may be implemented by one or more of the components in FIGS. 1 and 2 and/or other components, including other computing devices.

Figure 3:
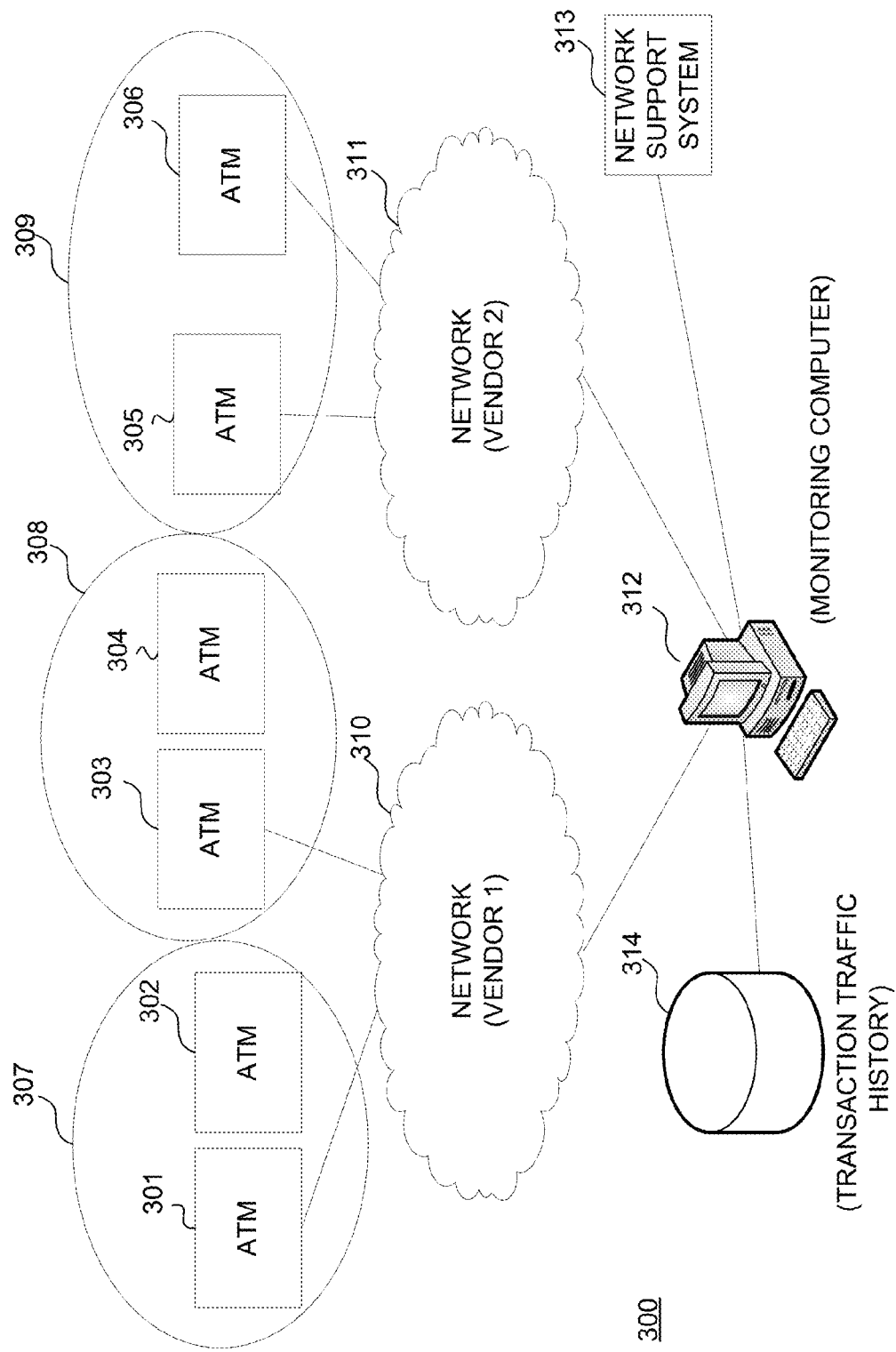
FIG. 3 illustrates a transaction system with a plurality of automated teller machines according to one or more aspects of the present disclosure.

FIG. 3 shows transaction system 300 with a plurality of automated teller machines 301-306 according to the present disclosure. Automated teller machine (ATM) 301-306 may be referred to as an automatic teller machine, automated banking machine (ABM), cash machine, or "a hole in the wall." Automated teller machine 301-306 typically comprises a computerized telecommunications device that provides customers of a financial institution with access to financial transactions in a public space without the need for a cashier, human clerk or bank teller. Using an automated teller machine, customers can access their bank accounts in order to make cash withdrawals, debit card cash advances, and check their account balances as well as purchase prepaid cell phone credit.

A financial institution can interact with automated teller machines 301-306 through a communications network, which is referred to as a network. The financial institution may monitor automated tell machines 301-306 through monitoring computer 312 that executes different applications to monitor transaction system 300. With an aspect of the disclosure, the root cause of an outage may be determined through a triage/troubleshooting procedure. The procedure may determine whether the root cause is improper internal operations (e.g., instability of an application) or a communications outage (e.g., telecommunications network/equipment problem). The severity assignment of the outage may be based only on the impact on the ATMs rather than the root cause.

According to an aspect of the disclosure, communications to different ATMs may be supported by different telecommunications vendors (referred as vendors). For example, communications to ATMs 301-304 and 305-306 are supported by network 309 (vendor 1) and network 310 (vendor 2), respectively. Moreover, automated teller machines 301-306 may be partitioned by regions, e.g., where automated teller machines 301-302, 303-304, and 305-306 are located in regions 307, 308, and 309, respectively. For example, transaction system 300 may span the New York City metropolitan area, where regions 307-309 correspond to Manhattan, Long Island, and northeastern New Jersey, respectively.

According to traditional systems, all automated teller machines 301-306 may be treated equally when determining the severity of an outage. Based on the severity, a vendor of a network assesses the urgency for correcting the outage, typically in accordance with a service level agreement (SLA) between the financial institution and the vendor. While the above approach may be consistent with the service level agreement, this approach might not accurately gauge the customer impact of the outage. The transaction volume may vary for different ATMs and for different times. For example, transaction volume for an automated teller machine located in a city's downtown is typically greater than an automated teller machine located at the outside fringes of the city. Also, traditional systems might not include the effects of the duration of an outage. However, the longer the outage duration, the greater the number of failed transactions, and consequently the greater the customer impact. Also, the transaction volume typically varies with the time of day (e.g., midnight versus noon), day of the week, and so forth.

Monitoring computer 312 may communicate with automated teller machines 301-306 on a periodic basis. When expected communications is disrupted, monitoring computer 312 deems that the corresponding automated teller machine 301-306 is experiencing an outage (which may be referred as an outage ATM). Monitoring computer 312 may gauge the severity of the outage based on the number of outage automated teller machines, the transaction volume of the outage automated teller machines, the duration of the outage, and the like.

With an aspect of the disclosure, monitoring computer 312 may determine the failed customer transactions by accessing data structure 314 to obtain the average transaction volume for the corresponding automated teller machine for the outage time duration. The average transaction volume may then be multiplied by the outage duration to estimate the number of failed customer transaction. For example, if automated teller machine 301-306 has an average transaction volume of 10 transactions per hour, the estimated number of failed customer transactions is 10 when the outage duration is 1 hour and 25 when the outage duration is 2.5 hours.

As will be further discussed, the severity of the outage may be determined from one or more outage parameters, including the number of outage automated teller machines, location of the outage automated teller machines, and/or estimated failed customer interactions. Monitoring computer 312 may then generate an indicator (e.g., a message) to network support system 313 to alert the responsible party to initiate action to correct the outage. As previously discussed, communications to different networks may be supported by different vendors, each having a separate service level agreement. In such a case, the indicator may be sent to support center 313 of the responsible vendor. Moreover, when the outage spans networks 310-311, the severity level may be specific to a network or may be aggregated over all of the networks. In the former case, the severity level may be driven by the service level agreement with the vendor; while in the latter case, the severity level may better reflect the effect over the entire transaction system.

FIG. 4 shows an example chart 400 for assessing a severity level of transaction system 300 that is experiencing an outage according to the present disclosure. An outage may occur for unplanned reasons 405 (e.g., network failure or power outage) or for planned reasons 406 (e.g., maintenance). With some embodiments, mapping the criteria for the number of outage automated teller machines to the severity level may be different for unplanned reasons 405 versus planned reasons 406. Also, the criteria for the number of outage automated teller machines may be further contingent on the duration of the outage.

The severity level 402, 403, or 404 may be based on the number of outage automated teller machines and the estimated failed customer interactions (FCIs) 401. As will be discussed with FIG. 8, monitoring computer 312 determines the estimated failed customer interactions from transaction traffic history data structure 314. However, other outage parameters and/or combinations of outage parameters may be used for determining the severity level. For example, some embodiments may use the ATM location as one parameter in conjunction with other outage parameters, including the outage duration.

In this example, there are three severity levels: first, second, and third severity levels 404, 403, and 402, respectively, where the first severity level has the most urgency. With an aspect of the disclosure, FCI 401 may be determined in different ways. For example, FCI 401 may be based on estimated FCIs or calculated FCIs. Calculated FCIs may be determined in hours, possibly days later after the occurrence by an automated system. The automated system may calculate the estimated loss of transactions based on the transaction volume patterns within each specific ATM. Estimated FCIs may be based on the average number of transactions that occur across or network during peak versus non-peak times. Specific ATM transactions by ATM may not be available real time, so the determination may use a general estimated loss of transactions to assess the FCI impact in order to assign a severity level of the outage. With the example shown in FIG. 4, the urgency for resolving the outage increases with a lower numbered severity level. For example, when the calculated (estimated) FCIs is less than 10,000 transactions or the number of outage automated teller machines is between 25 and 99 ATMs, the outage is determined to be at a third severity level.

With an aspect of the disclosure, the determination of the severity level may consider a single outage and/or multiple outages that have a cumulative impact and/or a regional impact to customers. For example, referring to FIG. 4, the criterion for the second severity level due to a communication outage is 100 to 500 ATMs impacted from a single outage or a cumulative impact greater than 15 minutes over multiple outages.

Referring to an example previously presented with FIG. 3, automated teller machines 301-306 may be partitioned by regions, where regions 307-309 correspond to Manhattan, Long Island, and northeastern New Jersey, respectively. Some embodiments may support different criteria for different regions. Also, the criteria for the entire transaction area (e.g., over combined regions 307-309) may differ from individual regions (region 307 versus region 308 versus region 309) and/or different vendors (regions 307-308 versus region 309). While the criteria may differ from a service level agreement, the criteria may better reflect the perspective of the customers. If the above criteria vary from a service level agreement, a vendor may wish to enhance service for the financial institution. Moreover, the financial institution may wish to modify the service level agreement when the service agreement is renewed to better reflect the customer's perspective.

Figure 5:
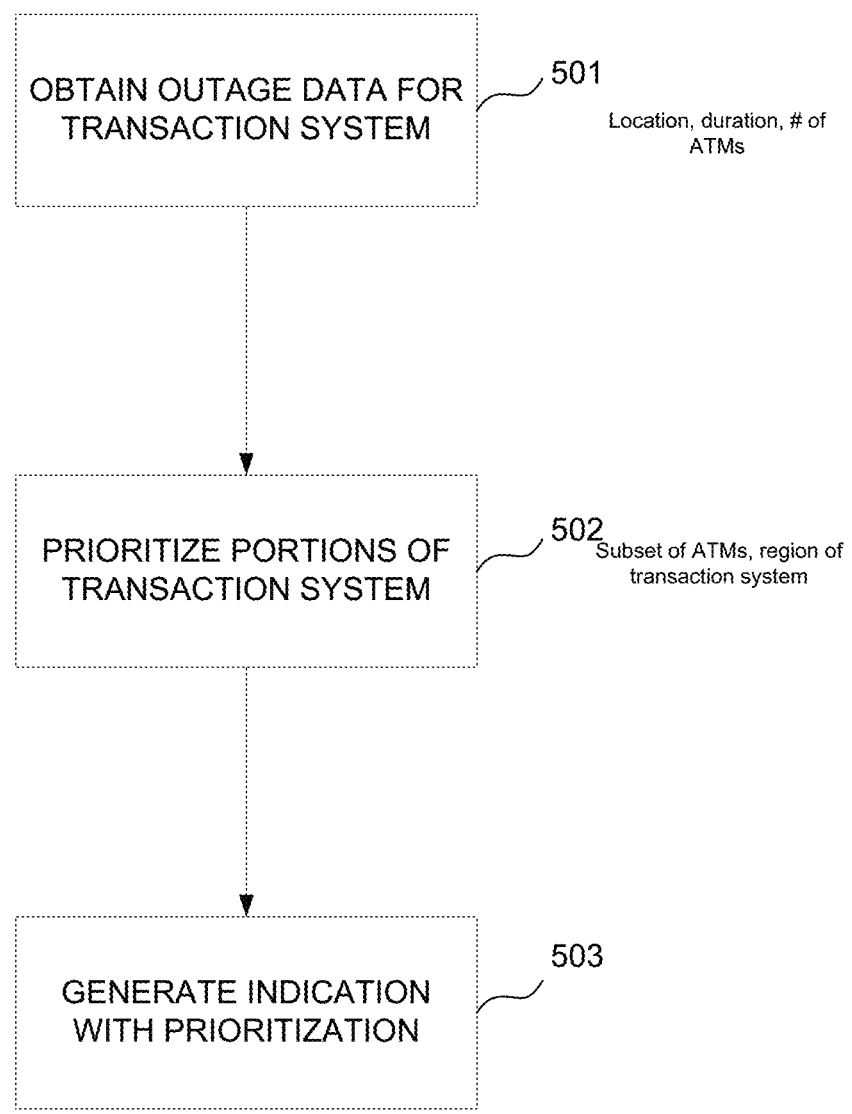
FIG. 5 illustrates a flow chart for assessing outage data for a transaction system according to one or more aspects of the present disclosure.

FIG. 5 shows process 500 for assessing outage data for a transaction system according to the present disclosure. Process 500 may use a set of criteria to create a severity rating that can automate the identification of automated teller machines 301-306 (as shown in FIG. 3) and/or region 305-306 based on a prioritization during an outage.

At block 501, monitoring computer 312 (as shown in FIG. 3) obtains outage data for transition system 300. For example, an outage with automated teller machine 301 may be detected by monitoring when computer 312 is not able to communicate with automated teller machine 301 through network 310. Outage data may include one or more parameters, including the number of failed customer transactions, duration of the outage, and/or location of an automated teller machine. For example, a financial institution may consider a particular automated teller machine to be in a highly strategic location with respect to other automated teller machines.

At block 502, monitoring computer 312 prioritizes the outage automated teller machines and/or regions. For each example, the service area of transaction system 300 may be partitioned into geographic regions 307-309, where each region is served by a subset of automated teller machines (e.g., region 308 served by automated teller machines 303-304 as shown in FIG. 3).

At block 503, monitoring computer 312 generates an indication (e.g., e-mail, short message service (SMS) message, custom message, or the like) that includes the determined prioritization as determined at block 502.

Figure 6:
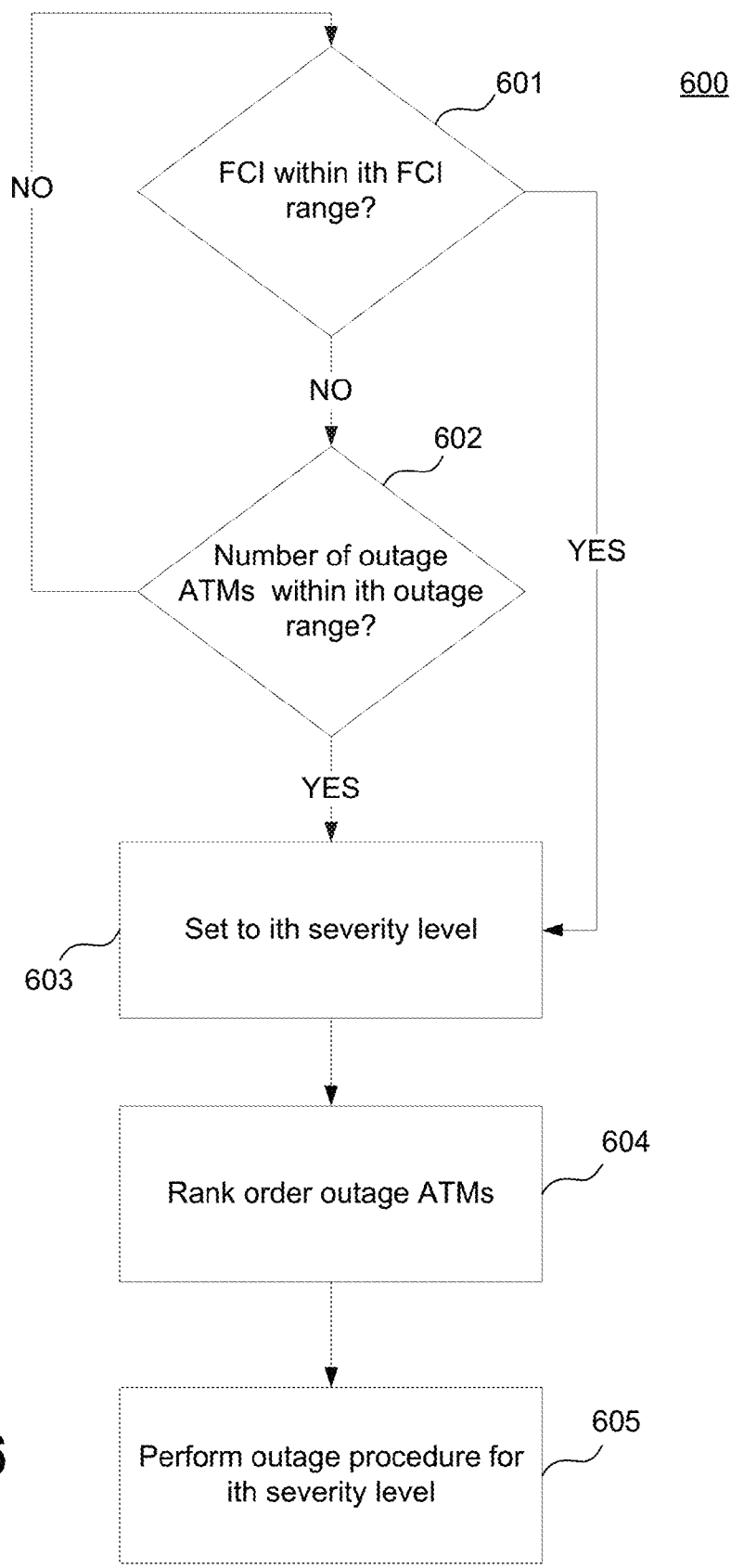
FIG. 6 illustrates a flow chart for assessing a severity level of a transaction system according to one or more aspects of the present disclosure.

FIG. 6 shows process 600 for assessing a severity level of a transaction system outage according to the present disclosure. At blocks 601 and 602, the number of estimated failed customer interactions (FCI) during the outage and the number of outage ATMs are respectively compared to the FCI and number of outage ATM criteria for the $i^{th}$ severity level. For example, referring to chart 400 shown in FIG. 4, for a communication outage, the FCI range and the outage ATM range for the second severity level are 10,000 to 25,000 FCIs and 100-500 automated teller machines (for down time greater than 15 minutes across a PRO), respectively. When the outage data is within the predetermined ranges, process 600 sets the severity level to the corresponding value at block 603.

While the severity level is based on either comparison at blocks 601 and 602 being true (corresponding to an OR logical function), another type of logic function (e.g., an AND logic function) or a plurality of logic functions may be used to determine the severity level of an outage. Also, other comparison results for other outage parameters may be logically combined to determine the severity level of an outage.

With some embodiments, the outage automated teller machines may be rank-ordered at block 604 based on the estimated failed financial transactions projected for a given ATM. The priority order may provide a preference for re-activating automated teller machines by the responsible party. Based on determined severity level, the appropriate outage procedure may be performed. For example, software may be updated only for the first severity level. Also, the severity level may dictate emergency change protocols that can be implemented to introduce change in the environment. Changes may include the authorization of logical/physical changes of the telecommunications equipment within network 300, internal ATM software changes, internal application/database changes, and external hardware/software changes.

Figure 7:
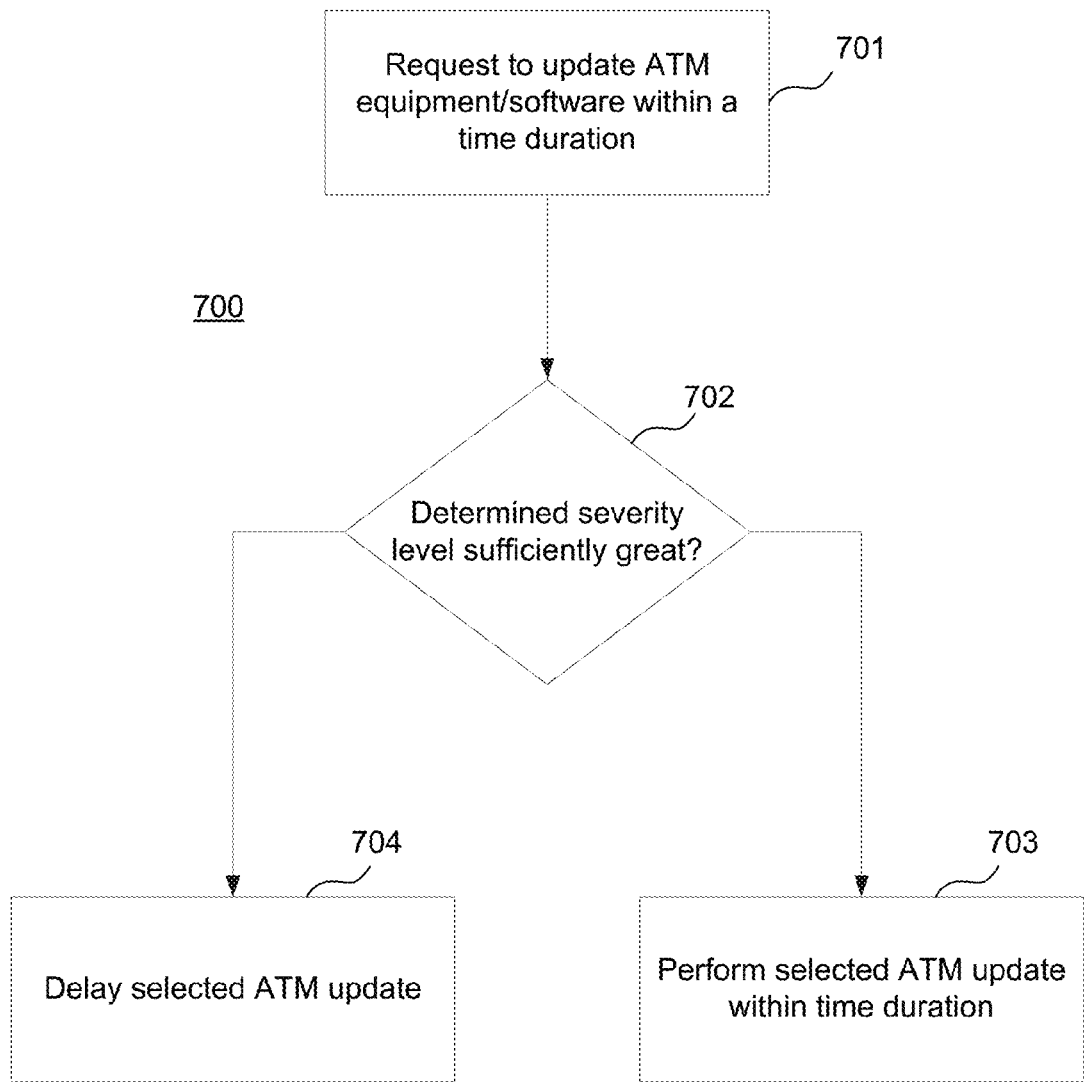
FIG. 7 illustrates a flow chart for determining whether to perform an immediate update within a transaction system according to one or more aspects of the present disclosure.

FIG. 7 shows process 700 for determining whether to perform an immediate update within a transaction system according to the present disclosure. At block 701 monitoring computer 312 receives a request to update some or all of the automated teller machines in transaction system 300. For example, maintenance personnel may request to update software that executes on the software to fix known bugs or to enhance the automated teller machine's capabilities. However, updating an automated teller machine may cause unanticipated problems, so the financial institution may authorize the update only when resolving the outage is sufficiently urgent, e.g., with the first and second severity level as determined at block 702. If so, updating is authorized as soon as possible at block 703. Otherwise the update is delayed until a scheduled time at block 704.

With an aspect of the disclosure, process 700 may treat different types of updates differently. For example, ATM software may be updated with first and second severity levels while ATM hardware may be updated only with the first severity level.

Figure 8:
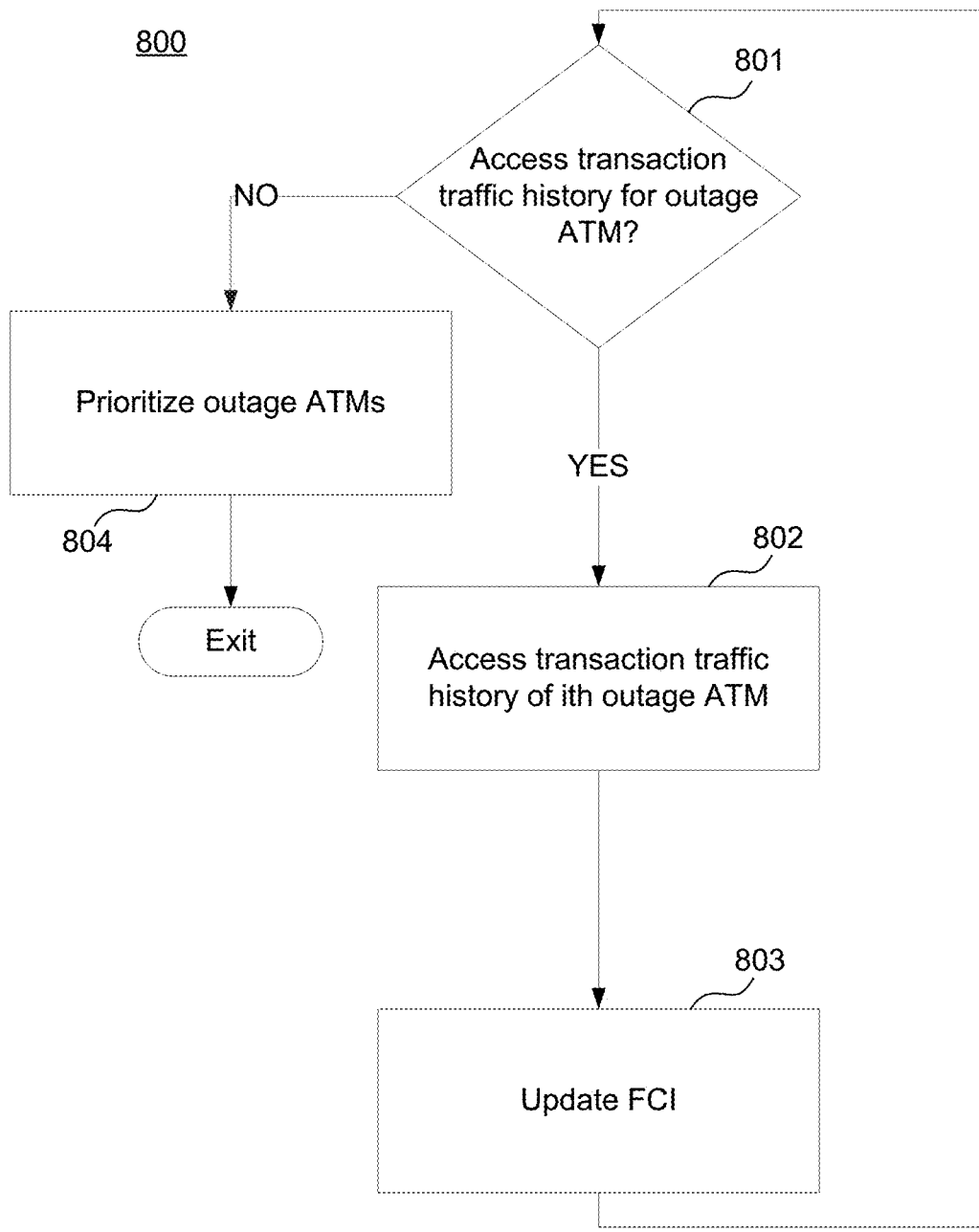
FIG. 8 illustrates a flow chart for determining a failed customer indicator for a transaction system according to one or more aspects of the present disclosure.

FIG. 8 shows process 800 for determining a failed customer indicator for a transaction system according to the present disclosure. At block 801, monitoring computer 312 determines whether to access transaction history data for outage automated teller machines in system 300 from data structure 314 (as shown in FIG. 3). For example, monitoring computer 312 may periodically access transaction history data (e.g., every 15 minutes) during the outage. Data structure 314 may have the historical average transaction activity for each automated teller machine according to the hour, month, and day of the week. At block 802 computer 312 accesses the historical outage data and updates the estimated failed customer interactions at block 803 based on an amount for the incremental duration of the outage. For example, if there are 100 outage ATMs, each having a historical average of 10 transactions per hour, the failed customer interactions is 1000 transactions if the outage continues for 1 hour. If the outage continues for a second hour and if the historical average increases to 15 transactions per hour, the estimated failed customer interactions is 2500 transactions for the outage.

If the historical average varies by automated teller machine, data structure 314 may have outage statistics on a per automated teller machine basis so that the estimated failed customer interactions may be updated on a per automated teller machine basis. Monitoring computer 312 may further prioritize the outage automated teller machines at block 804 according to the contribution of the automated teller machine to the estimated failed customer interaction. Maintenance personnel may then resolve the outage based on the prioritization.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments. They may determine that the requirements should be applied to third party service providers (e.g., those that maintain records on behalf of the company).

We claim:

1. A computer-assisted method for assessing a status of a computer transaction system, the computer transaction system including a plurality of automated teller machines (ATMs), a service area of the computer transaction system spanning a plurality of geographical regions, the plurality of geographical regions including a first geographical region and a second geographical region, the method comprising:

obtaining, by a processor, outage criteria for the computer transaction system, wherein the outage criteria is dependent on different geographical regions in the computer transaction system;

determining, by the processor, a first severity level for the first geographical region based on a first criteria for an outage in the computer transaction system, wherein the first geographical region comprises a first subset of the plurality of ATMs;

identifying, based on the first severity level, a first set of computer resources from a plurality of computer resources of the computer transaction system;

determining, by the processor, a second severity level for the second geographical region based on a second criteria for the outage, wherein the first criteria and the second criteria are different;

identifying, based on the second severity level, a second set of computer resources from the plurality of computer resources;

prioritizing, by the processor, the plurality of geographical regions of the computer transaction system based on the outage criteria, the prioritization indicative of an ordering for correcting the outage of a corresponding region of the computer transaction system;

generating, by the processor, an indication that includes information indicative of the prioritization;

based on the indication of the prioritization, initiating, by the processor, a recovery procedure to recover from the outage for a portion of the computer transaction system in a prioritized geographical region of the service area; and changing, by the recovery procedure based on the determined severity level of the prioritized geographical region, the identified set of computer resources of the computer transaction system.

2. The method of claim 1, wherein the prioritizing comprises:

determining a measure of failed customer transactions for each geographical region of the transaction system; and rank ordering the plurality of geographical regions based on the corresponding measures.

3. The method of claim 2, wherein the rank ordering is further based on a location of each geographical region of the transaction system.

4. The method of claim 1 further comprising:

determining a combined severity level for the plurality of geographical regions based on a third criterion for the outage, wherein the third criterion is different from the first and second criteria.

5. The method of claim 1, wherein the changing comprises:

updating software only for the portion of the computer transaction system in the prioritized geographical region.

6. The method of claim 1, wherein the changing comprises:

invoking an emergency change protocol to induce an environment change.

7. The method of claim 6, wherein the changing comprises:

authorizing at least one of a logical change and a physical change for telecommunications equipment within the portion of the computer transaction system.

8. The method of claim 6, wherein the changing comprises:

authorizing an internal ATM software change within the portion of the computer transaction system.

9. The method of claim 6, wherein the changing comprises:

authorizing at least one of an internal application change and an internal database within the portion of the computer transaction system.

10. The method of claim 6, wherein the changing comprises:

authorizing at least one of a hardware change and a software change within the portion of the computer transaction system.

11. A computer transaction system comprising:

a plurality of automated teller machines (ATMs);

at least one memory; and at least one processor coupled to the at least one memory and configured to perform, based on instructions stored in the at least one memory:

obtaining outage criteria for the computer transaction system, wherein:

the outage criteria is dependent on different geographical regions in a service area of the computer transaction system;

the service area spans a plurality of geographical regions; and the plurality of geographical regions includes a first geographical region and a second geographical region;

determining a first severity level for the first geographical region based on a first criteria for an outage in the computer transaction system, wherein the first geographical region comprises a first subset of the plurality of ATMs;

identifying, based on the first severity level, a first computer resource from a plurality of computer resources of the computer transaction system;

determining a second severity level for the second geographical region based on a second criteria for the outage, wherein the first criteria and the second criteria are different;

identifying, based on the second severity level, a second computer resource from the plurality of computer resources, wherein the first and second resource are different;

prioritizing the plurality of geographical regions of the computer transaction system based on the outage data, the prioritization indicative of an ordering for correcting the outage of a corresponding region of the computer transaction system;

generating an indication that includes information indicative of the prioritization;

based on the indication of the prioritization, initiating a recovery procedure to recover from the outage for a portion of the computer transaction system in a prioritized geographical region of the service area, wherein the prioritized geographical region is one of the plurality of geographical regions and comprises a corresponding subset of the plurality of ATMs; and changing, by the recovery procedure based on the determined severity level of the prioritized geographical region, the identified computer resource of the computer transaction system.

12. The computer transaction system of claim 11, wherein the at least one processor is further configured to perform:

determining a measure of failed customer transactions for each geographical region of the transaction system; and rank ordering the plurality of geographical regions based on the corresponding measures.

13. The computer transaction system of claim 12, wherein the rank ordering is further based on a location of each geographical region of the transaction system.

14. The computer transaction system of claim 11, wherein the at least one processor is further configured to perform:

determining a combined severity level for the plurality of geographical regions based on a third criterion for the outage, wherein the third criterion is different from the first and second criteria.

15. The computer transaction system of claim 11, wherein the at least one processor is further configured to perform:

updating software only for the portion of the computer transaction system in the prioritized geographical region.

16. The computer transaction system of claim 11, wherein the at least one processor is further configured to perform:

invoking an emergency change protocol to induce an environment change.

17. A non-transitory computer-readable storage medium storing computer-executable instructions that, when executed, cause a processor at least to perform operations comprising:

obtaining, by the processor, outage criteria for a computer transaction system, wherein:

the outage criteria is dependent on different geographical regions in a service area of the computer transaction system;

the service area spans a plurality of geographical regions; and the computer transaction system comprises a plurality of automated teller machines (ATMs);

determining, by the processor, a first severity level for the first geographical region based on a first criteria for an outage in the computer transaction system, wherein a first geographical region comprises a first subset of the plurality of ATMs;

identifying, based on the first severity level, a first set of computer resources from a plurality of computer resources of the computer transaction system;

determining, by the processor, a second severity level for a second geographical region based on a second criteria for the outage, wherein the first criteria and the second criteria are different;

identifying, based on the second severity level, a second set of computer resources from the plurality of computer resources;

prioritizing, by the processor, the plurality of geographical regions of the computer transaction system based on the outage criteria, the prioritization indicative of an ordering for correcting the outage of a corresponding region of the computer transaction system;

generating, by the processor, an indication that includes information indicative of the prioritization;

based on the indication of the prioritization, initiating a recovery procedure to recover from the outage for corresponding subset of ATMs of the computer transaction system in a prioritized geographical region, wherein the prioritized geographical region is one of the plurality of geographical regions; and changing, by the recovery procedure based on the determined severity level of the prioritized geographical region, the identified set of computer resources of the computer transaction system.

18. The non-transitory computer-readable storage medium of claim 17, wherein the computer-executable instructions, when executed, cause the processor to perform:

determining a measure of failed customer transactions for each geographical region of the transaction system; and rank ordering the plurality of geographical regions based on the corresponding measures.

19. The non-transitory computer-readable storage medium of claim 18, wherein the rank ordering is further based on a location of each geographical region of the transaction system.

20. The non-transitory computer-readable storage medium of claim 17, wherein the computer-executable instructions, when executed, cause the processor to perform:

determining a combined severity level for the plurality of geographical regions based on a third criterion for the outage, wherein the third criterion is different from the first and second criteria.

21. A computer transaction system comprising:

a plurality of automated teller machines (ATMs), the plurality comprising a first subset of ATMs and a second subset of ATMs;

at least one memory; and at least one processor coupled to the at least one memory and configured to perform, based on instructions stored in the at least one memory:

obtaining outage criteria for the computer transaction system, wherein the outage criteria is dependent on different partitions in a service area of the computer transaction system and wherein the service area spans a plurality of partitions;

determining a first severity level for a first partition based on a first criteria for an outage in the computer transaction system and a second severity level for a second partition based on a second criteria for the outage, wherein the first partition and the second partition comprise the first subset and the second subset of ATMs, respectively, and wherein the first criteria and the second criteria are different;

identifying, based on the first severity level, a first computer resource from a plurality of computer resources of the computer transaction system;

identifying, based on the second severity level, a second computer resource from the plurality of computer resources, wherein the first and second resources are different;

prioritizing the plurality of partitions of the computer transaction system based on the outage data, the prioritization indicative of an ordering for correcting the outage of a corresponding partition of the computer transaction system;

based on the prioritization, initiating a recovery procedure to recover from the outage for a portion of the computer transaction system in a prioritized partition of the service area, wherein the prioritized geographical partition is one of the plurality of partitions and comprises a corresponding subset of the plurality of ATMs; and changing, by the recovery procedure based on the determined severity level of the prioritized partition, the identified computer resource of the computer transaction system to recover from the outage.

* * * * *